(No Model.) 3 Sheets—Sheet 2.

J. B. GRISWOLD.
BRICK KILN.

No. 489,805. Patented Jan. 10, 1893.

WITNESSES:
Fred G. Dieterich
Jos. A. Ryan

INVENTOR:
J. B. Griswold
BY Munn &Co
ATTORNEYS

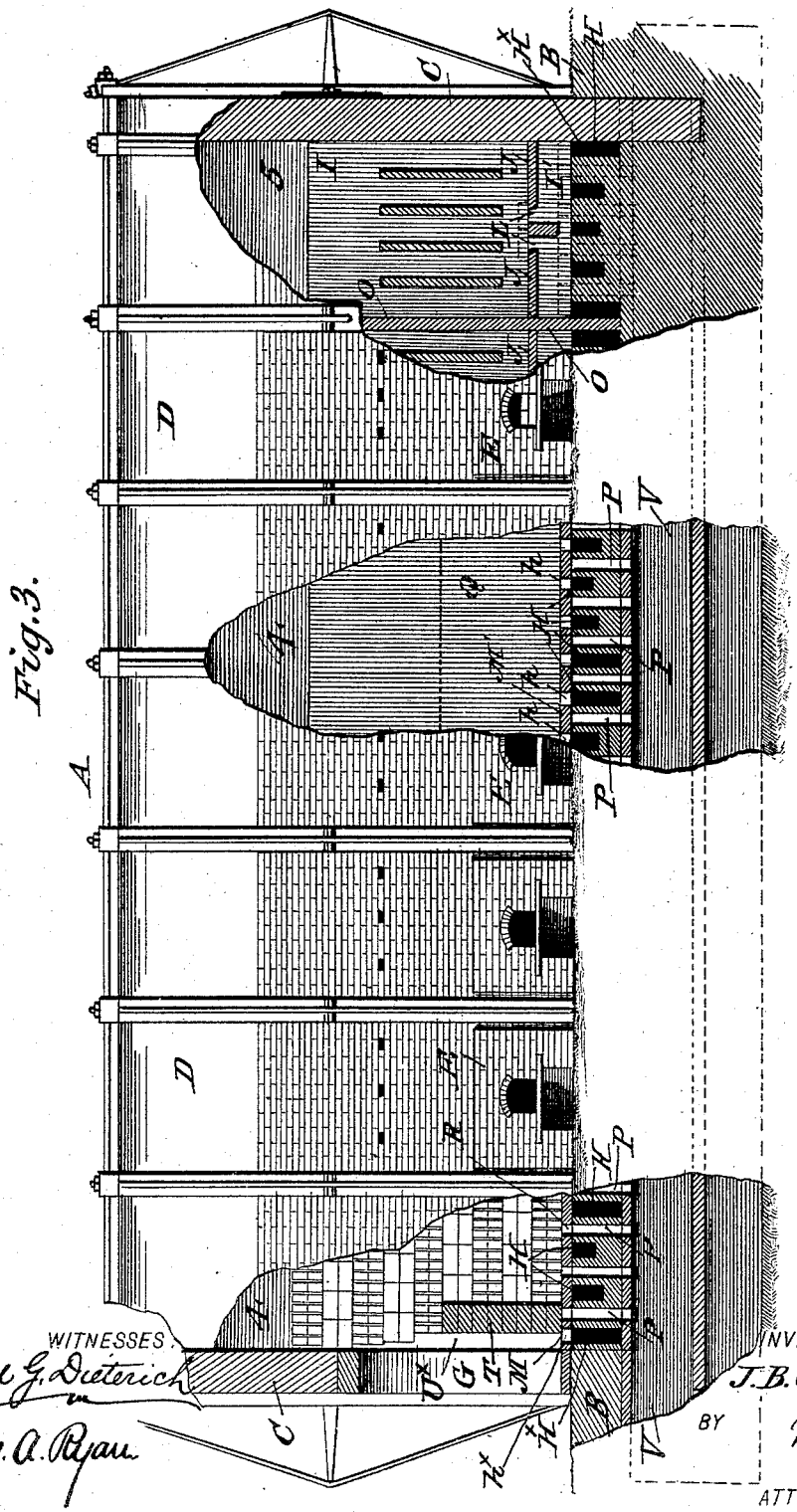

UNITED STATES PATENT OFFICE.

JOHN B. GRISWOLD, OF ZANESVILLE, OHIO, ASSIGNOR OF ONE-HALF TO CLARENCE V. GRAHAM.

BRICK-KILN.

SPECIFICATION forming part of Letters Patent No. 489,805, dated January 10, 1893.

Application filed January 28, 1892. Serial No. 419,611. (No model.)

*To all whom it may concern:*

Be it known that I, JOHN B. GRISWOLD, a citizen of the United States, residing at Zanesville, in the county of Muskingum and State of Ohio, have invented certain new and useful Improvements in Brick-Kilns, of which the following is a specification.

This invention relates more particularly to improvements on my patent kiln No. 466,676, and it has for its object to simplify the construction of such kiln to render the operation the more effective and in a much less time.

In the patent referred to I have shown a kiln operated on a down draft, the heat flues being so arranged that the floor of the kiln will be thoroughly heated, so as to burn the lower ware by radiated heat. In the present case I arrange the flues in such a manner that the kiln is operated on a combined up and down draft the intense or direct heat, being driven against the lower sides and under the floor of the kiln to thoroughly heat them, to produce radiated heat, and then up into the center of the kiln through flue openings in the bottom arranged centrally thereof; to provide for a complete and even distribution of the intense heat to such portion of the ware most in need of it a short longitudinal vertical heat channel is formed by some of the ware so as to cause such heat to pass laterally among such ware, toward the sides of the kiln, (owing to the induction caused by the radiated heat at the sides and bottom) and then down out through the discharge flues; short vertical flues similar to the central flues being also provided by setting the ware solid at the ends of the kiln so as to cause the direct heat to be deflected upwardly among the end ware, the upper ware being uniformly burned by the fire and heat caused to pass up over the vertical side flues into the kiln chamber, which is drawn down and commingles with the intense bottom heat which is drawn off through the draft flues in the bottom of the kiln.

A further object of this invention is to provide simple means whereby the heat can be deflected so as to cause a greater or less heat to travel up the side flues into the kiln or under the floor, or move to one portion thereof as may be desired.

Figure 1:
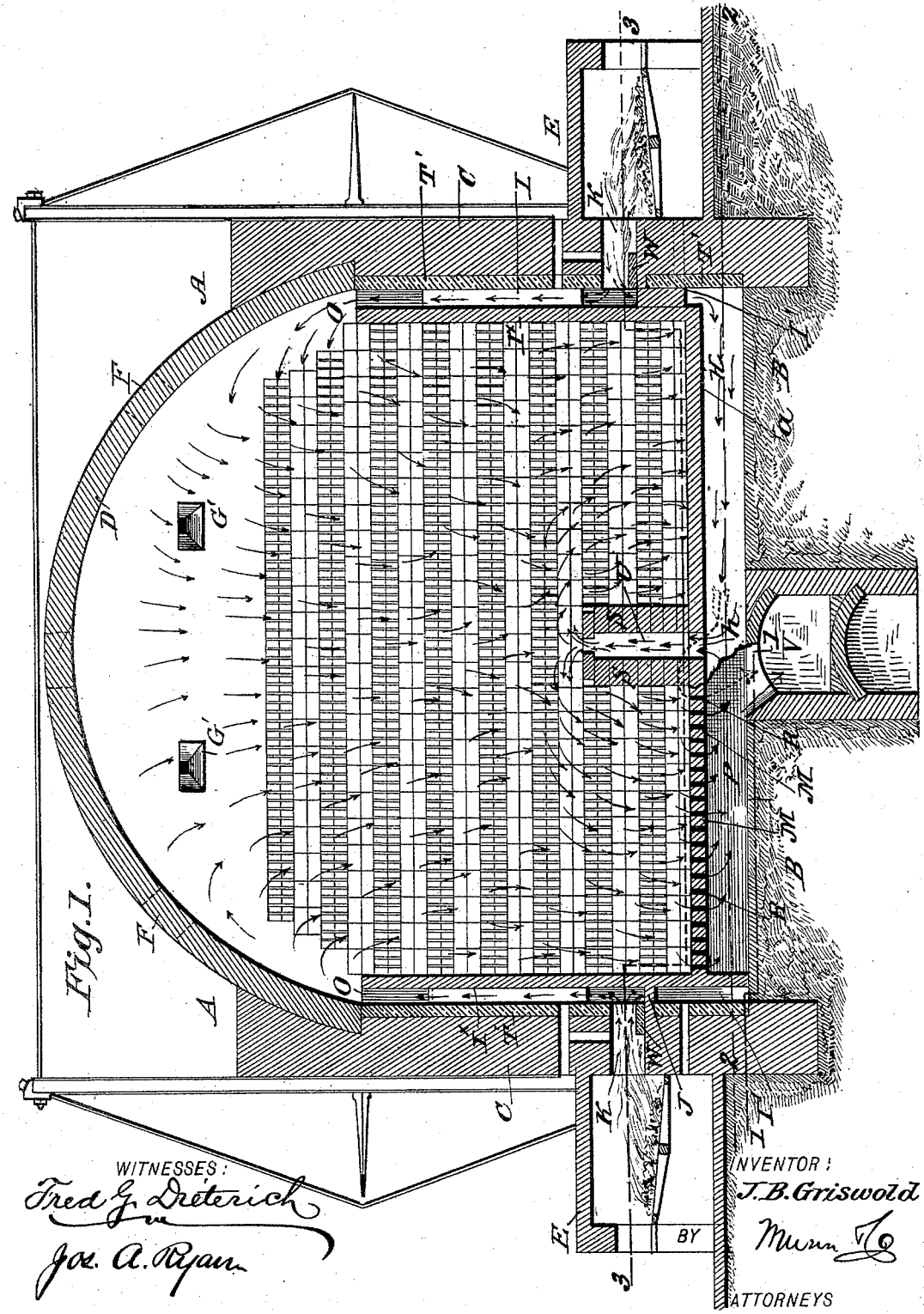
Figure 2:
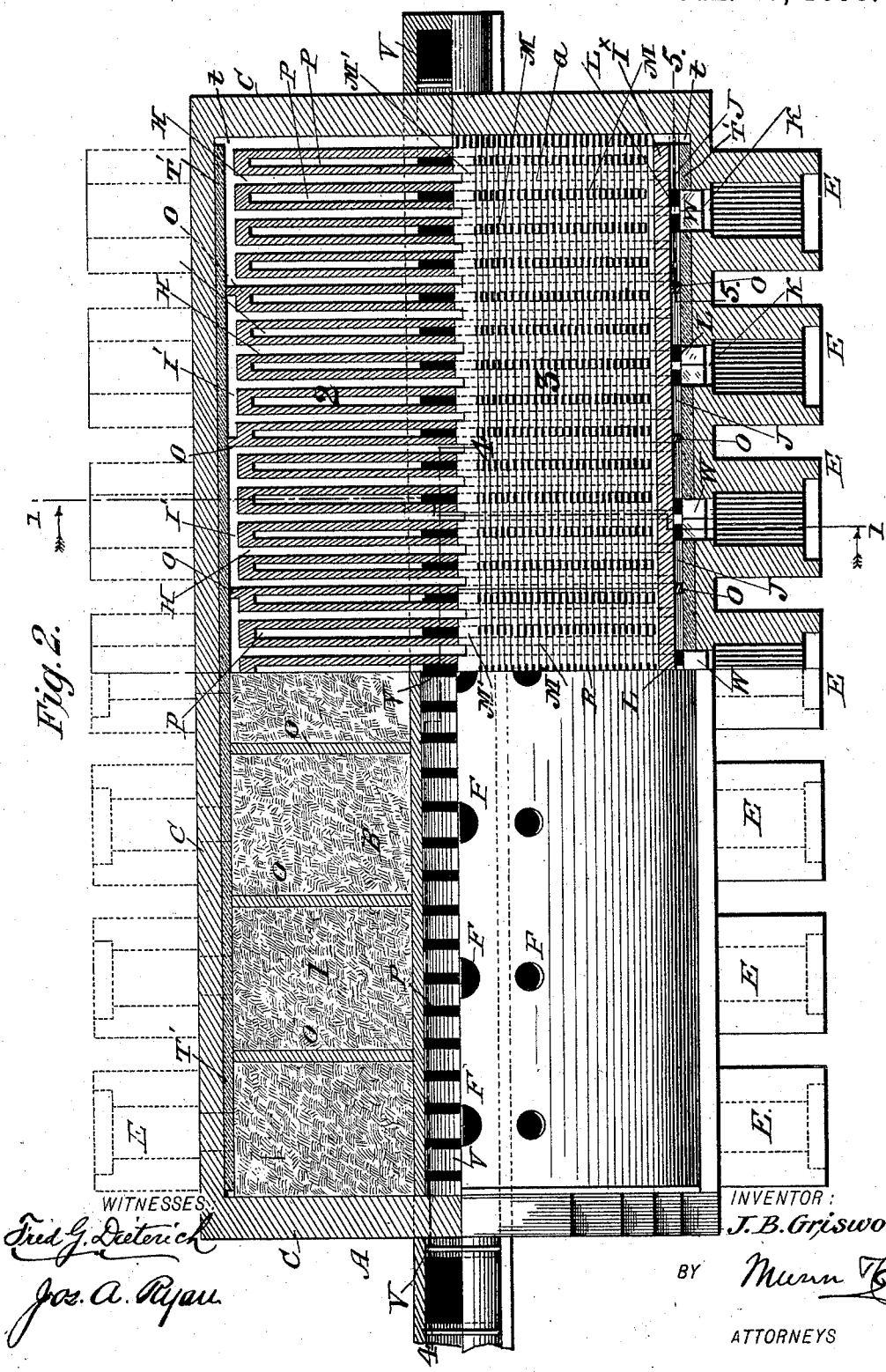

To these ends my invention consists in the peculiar combination and novel arrangement of parts all of which will hereinafter be fully described in the annexed specification and then pointed out in the claims reference being had to the accompanying drawings in which:

Figure 1, is a vertical cross section of my improved kiln taken on the line 1—1 Fig. 2. Fig. 2, is a top plan view, parts of the kiln being shown in horizontal section, on the lines 1—1 2—2 3—3 Fig. 1, such portions being numbered 1—2—3 respectively on Fig. 2. Fig. 3, is a side view, parts being in section such parts being numbered 4—5, the sections being taken on the lines 4—4 5—5 in Fig. 2.

In the main my improved kiln is constructed similar to the kiln shown in my patent referred to, except that it has its heating flues arranged in sections, each section being supplied by two furnaces whereby all the sections may be in use at one time or any one of them may be used separately as the condition of the kiln may require.

Referring to the accompanying drawings A, indicates the kiln, which is preferably rectangular in shape as shown, it being understood that it may however, for burning certain kinds of ware, be formed round.

Referring now more particularly to Figs. 1 and 2, B indicates the ground foundation C the main side and end walls, D the crown, F the openings in the crown, E the furnaces, G the doors in the ends of the kiln and G' the peep holes.

As before stated the heat flues are arranged in sections, connected each with a furnace, and as shown in Fig. 2 each section has a series of transverse flues H which extend entirely across the kiln under the floor *a* and such flues connect with the vertical flues into which the furnaces discharge. These vertical flues are each of a width equal to the distance between the division walls O, and as will be noticed by reference to Fig. 1, are each divided by a horizontal wall J, the upper face of which is in a horizontal plane with the base of the furnace outlet K, whereby such flues are divided into upper and lower sections I, I' respectively the lower section communicating with the upper by means of the divided opening L, L, as shown.

The bottom of the kiln floor is formed with a series of transverse slotted sections M which sections have a central solid portion M' as shown, and such sections communicate with a series of transverse draft flues, P, which are alternately arranged between the hot air flue sections H such flues P opening at their central portions into a main flue V, which connects with the stack and is arranged in a manner precisely similar to that shown in my other patent referred to. Each of the flues H, has an opening $h$ in its top which opens up through the central solid portion of the kiln floor which openings open into a vertical flue U arranged longitudinally across the kiln floor. The flue U extends up but a short distance and in practice it is formed by laying that part of the ware indicated by S in solid longitudinal rows to each side of the openings $h$, the upper end or discharge being gradually reduced by stepping the brick as shown.

I desire it distinctly understood that it is very material that the flue U should not extend too far up into the ware, and its discharge end should be gradually closed as stated, as it is necessary that the intense heat which passes up into the said flue U, should be caused to thoroughly disseminate among the adjacent ware.

In all down draft kilns where the heat first strikes the ware at the top and passes down into the ware the water smoke is first generated at the top of kiln and seeks to escape at the bottom, where the greater part of it condenses thereby producing a sluggish movement of the water smoke, clogging the bottom of the kiln and discoloring the ware by the sulphur deposited on the wet bottom ware which afterward burns into them.

By arranging the heat flues under the kiln and to the sides thereof as stated, and drawing the intense heat up into the center of the kiln and disseminating it among the lower or wet brick it will be impossible for the water smoke to condense, as the lower or bottom ware is heated first the water smoke or steam as soon as it is created is immediately drawn off into the stack flue. Furthermore by arranging the short vertical flue Q as stated, the heat which passes out from it strikes into that portion of the ware, which needs it the most, and is drawn over toward the sides and in a downward direction by the induction caused by the radiated heat, at the sides and the suction draft. Such of the products of combustion which pass up into the vertical flues I pass up over the ware and is drawn down through the same where it commingles with the up draft heat from the central flue U, and then passes out with it through the openings R into the flues P and then into the main flue V as clearly indicated by the arrows in Fig. 1.

It should be stated that without providing a short vertical flue U in the center of the kiln as shown the results desired (i. e., burning the center of the ware) could not be satisfactorily obtained, as the products of combustion would as they pass up through the openings $h$ seek to escape out through the adjacent discharge openings R, as indicated by the dotted arrow in Fig. 1.

To provide for effectually and uniformly burning the end ware the end flues $H^\times$ have a series of openings $h^\times$ in their tops which extend entirely across the kiln floor and open into the kiln (see Fig. 2) and to the inner edges of which are formed short transverse solid walls T (see "4" Fig. 3). which are of a height similar to the longitudinal walls S, and serve to make end channels $U^\times$, which are also gradually closed at the top by stepping the ware as shown. It will thus be seen that the ware in the ends of the kiln can be thoroughly burned without the necessity of the end flue channels extending entirely up to the top of the kiln.

It will be noticed by referring to Fig. 3, at that portion marked 5, that the several flues H in each section of flues, are graduated, the center one being the shallowest, the end ones the deepest and the intermediates ones, of intermediate depth such arrangement providing for a more equal distribution of the heat. Thus the end flues of each section which are the farthest away from the furnace outlets have the largest heat area, while those nearest such outlets have a less area.

W, W indicate the fire blocks which are adapted to be moved over the openings L L in the horizontal walls J, whereby they can be readily adjusted to wholly or partially close such openings, to partially or almost entirely cut off the heat from either side of the section of flues I and H.

While I prefer to form the longitudinal flue U and the end flues $U^\times$ by arranging the ware as stated, it is manifest that the side walls made by such ware may be rigidly built within the kiln and be a permanent part thereof.

Kilns of this character usually have a fire brick lining on the inner faces of their side walls, which lining extends out to and abuts the end walls. Such construction has however its disadvantages as the lining after it becomes very hot expands and presses against the end walls and bulges them out (see dotted lines Fig. 2) and render the repairing of such walls frequently necessary.

In the construction shown the brick lining T' does not extend to the end walls (see Fig. 2). nor does the flue walls $I^\times$ abut them, they stopping short of such walls, whereby open ways $t$ are provided, which ways serve the double purpose of admitting of a free circulation of hot air at the corners of the kiln and also allowing for expansion of the lining without the danger of the end walls being disturbed.

From the foregoing description taken in connection with drawings the complete operation and advantages of my invention will be readily understood by those skilled in the art to which it appertains.

Having thus described my invention what I claim and desire to secure by Letters Patent is:

1. A brick kiln comprising a main chamber having vertical flues at its sides, extended up to the top of the kiln chamber to discharge onto the top of the ware, transverse heat flues, under the floor, having openings, communicating with the kiln, said floor having a channel way arranged to receive the heat products from said transverse flue openings whereby to disseminate the intense up draft heat into lower portion of the ware, and exit slots in the said floor arranged intermediate the sides of the kiln and the central channel way, communicating with the stack flue, all arranged substantially as shown whereby the disseminated up draft heat, will be drawn off through such exits with the down draft, as and for the purpose described.

2. In a brick kiln constructed to have a down draft, the distributing flues arranged transversely under the floor and opening through such floor to discharge into the kiln, of a wall arranged at each side of such flue openings whereby to form a continuous heat channel such wall being stepped to gradually close the said channel way substantially as and for the purposes described.

3. In a brick kiln having a slotted floor and constructed to have a down draft, of the transverse heat flues arranged at the end walls of the kiln extended under the floor, such floor having a transverse series of flue openings communicating with the said heat flues and shallow channel ways formed on the kiln floor at the ends thereof arranged to receive the combustion products as they pass up through such flue openings and deflect them toward the center of the kiln substantially as and for the purpose described.

4. The combination with the main chamber having a series of slotted floor sections and a series of openings $h$ arranged longitudinally of and intermediate the slotted sections and a series of openings $h^\times$ at the ends of the kiln the flue sections I I' arranged as shown, the furnaces connected with such sections the transverse distributing flues $H^\times$, communicating with the openings $h^\times$, and shallow channel ways U U$^\times$ projected up into the kiln and arranged to receive the heat from the openings $h$ and $h^\times$ respectively, as and for the purpose described.

5. A brick kiln having a fire brick lining on its inner side faces, the ends of which stop short of the end walls, whereby an open way is provided between the ends of such lining and the end walls substantially as and for purpose described.

JOHN B. GRISWOLD.

Witnesses:
SOLON C. KEMON,
FRED G. DIETERICH.